March 20, 1973  J. F. IRVING  3,721,355

VEHICLE MOUNTED LOADER AND UNLOADER

Filed Sept. 27, 1971  3 Sheets-Sheet 1

INVENTOR.
JOSEPH F. IRVING

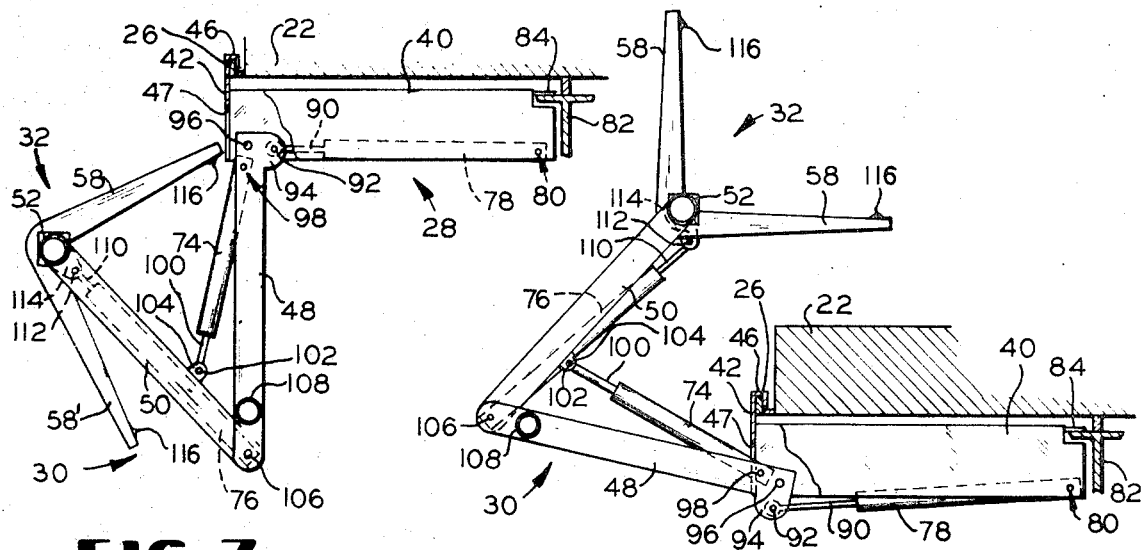
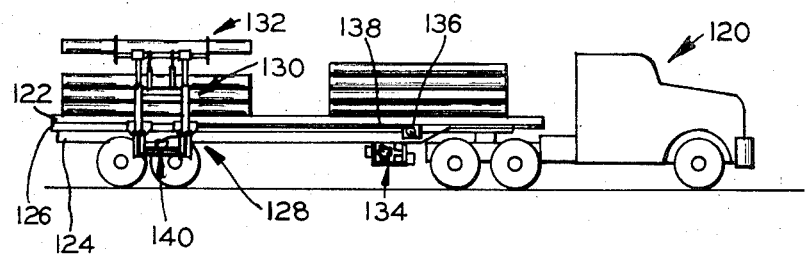
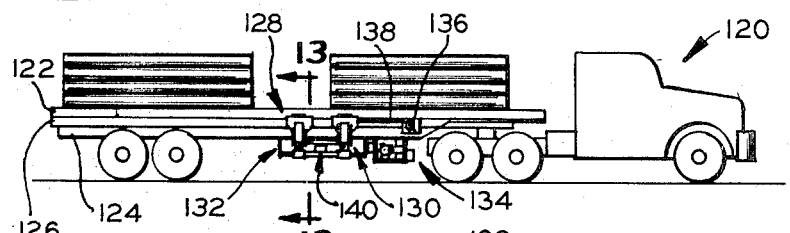
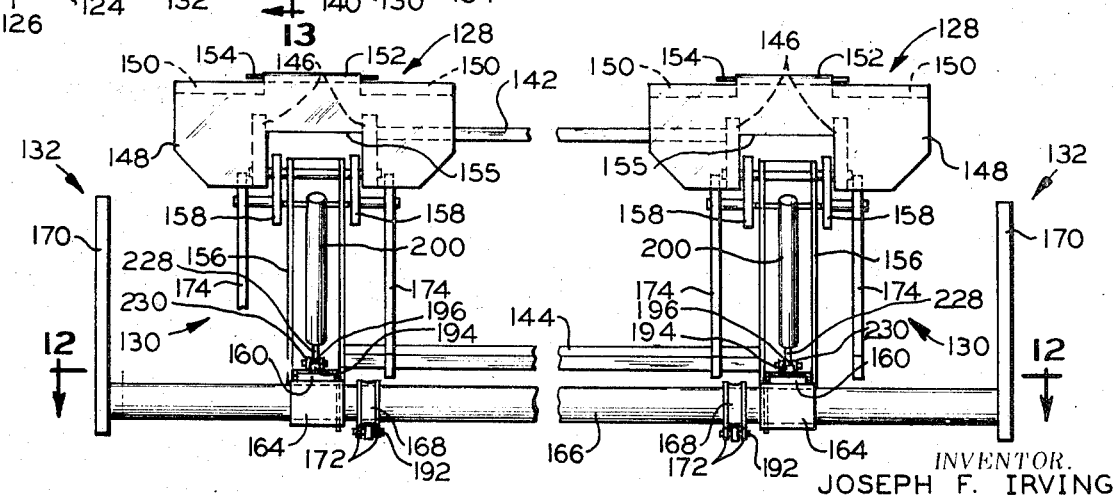

INVENTOR.
JOSEPH F. IRVING

United States Patent Office 3,721,355
Patented Mar. 20, 1973

3,721,355
VEHICLE MOUNTED LOADER AND UNLOADER
Joseph F. Irving, 316 Fulton St., Swanton, Ohio 43558
Filed Sept. 27, 1971, Ser. No. 183,870
Int. Cl. B60p 1/48
U.S. Cl. 214—80
19 Claims

ABSTRACT OF THE DISCLOSURE

A vehicle mounted mechanism for manipulating long load units such as pipe lengths which extend over a substantial portion of the load carrying lengths of the vehicle. The mechanism includes an articulate linkage attached to move along the side of the vehicle bed. The linkage is operable between the ground and an elevation substantially above the bed and over a substantial range transverse of the bed to engage elongate objects for transfer between ground elevation and the bed. The linkage includes an inner and outer boom together with a cradle, all of which are automatically collapsible and retractable, stored beneath and within the width limits of the bed of the vehicle to provide adequate road clearance and form a compactly stored unit when the vehicle is in transit. In one embodiment the linkage is capable of operating in a position adjacent the wheels of a semi-trailer and of being stored between the wheels on the trailer and the wheels on the truck.

BACKGROUND OF THE INVENTION

In transporting heavy and bulky articles by vehicle, it has been a problem to load and unload the vehicle where the articles could not be handled manually. Where the articles were both heavy and elongate, such as large pipe, a crane or similar machine was used to load and unload the articles on the bed of a flat truck. More recently, apparatus have been developed for use in association with the structural frame work of trucks and semi-trailers which can be attached to the truck or stored on it so as to be always available for loading or unloading the vehicle. A major problem with such apparatus has been its bulk. When not in use, it should fit within the allowable dimensional limits for the vehicle without reducing the useful space on the vehicle.

Apparatus have been located below the bed of the vehicle, adjacent the side of the vehicle and have been made portable for storage on the vehicle. Portable devices require considerable time to unpack and breakdown and store for each use. The size and weight of their components is limited since they must be manipulated to erect them for use. Devices on the side of the vehicle either protrude objectionally and are vulnerable to damage or are indented into the bed of the vehicle and reduce the load capacity. Devices located below the bed of the vehicle are incapable of stacking objects on the vehicle due to their limited range of travel between the ground and the bed of the vehicle dictated by the restricted space within the width of the bed in which they are retracted for storage.

One device uses a linkage mounted below the vehicle bed on a base slidable transverse of the bed. This permits the linkage to be moved beyond the side of the bed for operating purposes and to be stored beneath the bed when the base is retracted. The linkage operates between the ground and an elevation above the bed of the vehicle, but is limited to movement within a vertical plane adjacent the side of the vehicle. The device, therefore, only functions as an elevator for lifting the articles and has no load supporting motion transverse of the vehicle. This required that the articles be brought to it for loading and that a skid be provided for manually rolling the articles onto the bed of the vehicle. It is undesirable to manually transfer the articles to the loading device, and even more of a problem to manually manipulate the articles in the elevated position. Use of augmenting pry bars and skids to slide or roll the articles across the width of the bed can result in damage to the articles.

Another problem, particularly with longer length semi-trailers having tandem loads, is to properly align the device with respect to the length of the article. The devices affixed to the side of the vehicle cannot be shifted to accommodate off-center or tandem loads and are, therefor, limited to use with a particular load configuration.

Further, where the loading devices have been power actuated, the power package has been associated with the vehicle and its engine. Sometimes the vehicle electric system is used to energize a separate power package mounted on the vehicle such as a hydraulic pump with electric or engine drive while at other times the vehicle drive system itself is used to provide power. Generally, the power packages have been vehicle mounted for the above reasons and to avoid using space on the load carrying portion of the vehicle which would therefore not be available for transporting a payload. As a result of mounting the power package on the vehicle proper, or cab, they have been limited in use on trailers where it is desirable to separate the trailer from its cab. If the cab is to continue in use while the trailer is used for storage or is unloaded, separating the trailer and cab also separates the power package from the loading device on the trailer leaving it inoperable. Where the loading device is to be capable of traveling the length of the trailer, a suitable location on the trailer itself for a power package becomes even more of a problem.

SUMMARY OF THE INVENTION

The present invention relates to load manipulating devices and more particularly to such devices for mounting on and traveling with vehicles having accessible loading beds.

The aforenoted limitations of prior art load manipulating devices are overcome, according to this invention, by a combination of load engaging element, such as a cradle, movably mounted on articulated booms which can be positioned over a broad range in both the vertical and horizontal dimensions. Boom motion affords means for positioning the load engaging element at selected locations longitudinal of an elongate load carried with its length parallel to the vehicle length. It also positions the load engaging element over a range of positions from ground level beside the vehicle and outwardly therefrom in a horizontal range to a range above and across the vehicle bed whereby elongate articles can be stacked and unstacked on the ground or vehicle bed.

The loader manipulating device includes a base for attachment on the vehicle which base supports an inner boom pivoted by one end from the base about an axis parallel with one edge of the vehicle bed. An outer boom is pivoted by one end from the other end of the inner boom about an axis which is also parallel to the edge of the vehicle bed. The outer boom supports means for engaging objects, such as pipes, to be transferred between the ground and the vehicle bed which is at an elevation substantially above that of the ground. A second pair of inner and outer booms may be provided spaced longitudinally along the vehicle from the first pair and on common pivot axes with the first pair. The two identical pairs of booms provide a broad based support for the means for engaging objects. The means for engaging objects is pivotally attached to the free ends of the outer booms and may include a cradle having two pairs of arms connected to each other and extending from each other at generally right angles. Means interconnecting the arms form the pivotal connection between the arms and the outer booms so that the arms may be pivoted in one direction around an axis parallel to the length of the vehicle to engage an object and returned in the opposite direction to deposit it on the vehicle bed subsequent to raising the booms. Operating means connected to the base and the inner booms may take the form of pivotally mounted hydraulic cylinders. Additional cylinders are provided between the inner and outer booms to provide for independent operation of the inner and outer booms. The booms allow the cradle to be positioned at any elevation between the ground and an elevation substantially above the vehicle bed to transfer objects from the ground to the bed. The inner and outer booms are so proportioned to the vehicle that they can also be collapsed or folded upon themselves and retracted beneath the vehicle bed along with the cradle so that no element of the loader and unloader extends beyond the width of the bed.

The base of the loader and unloader may be slidable with respect to the length of the side of the vehicle bed to align the loader and unloader in a position centering the cradle on the length of an object on the vehicle bed. One embodiment of the loader and unloader incorporates a sub base into the base for supporting the cylinder operating the inner boom in a position adjacent to and outboard of the bed of the trailer. The sub base allows the base to travel past the wheels of the vehicle in traveling along the side of the vehicle bed. In another embodiment the power source is mounted directly on and moves with the loader and unloader making an integral package which may quickly be installed on a vehicle.

Further, the loader and unloader provides an automatic powered means for positive handling of objects to be transferred which is automatically collapsible and retractable into a compact package when the vehicle is in transit. It has a very high degree of maneuverability for engaging the objects to be transferred from a plurality of locations on and off the vehicle and is readily adjusted to align with the lengths of the objects and tandem loads.

BRIEF DESCRIPTION OF THE DRAWINGS

FIGS. 7 and 8 are views similar to FIG. 5 illustrating the apparatus in different operative positions;

FIG. 9 is an elevational view of another embodiment of the present invention mounted on a semi-trailer and positioned to transfer an object between load supports and the semi-trailer;

FIG. 10 is a view similar to FIG. 9 illustrating the apparatus in a stored position for transit;

FIG. 11 is an enlarged view of the apparatus in FIG. 10;

DESCRIPTION OF THE PREFERRED EMBODIMENT

Figure 1:
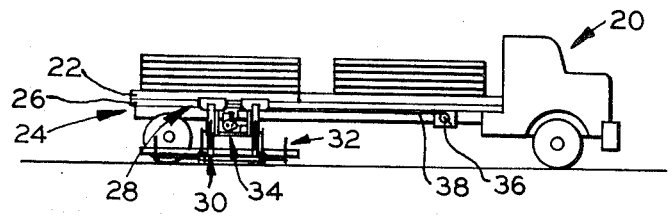
FIG. 1 is an elevational view of the apparatus in accordance with the present invention mounted on a truck and positioned to transfer an object between its load, supports and the ground.
Figure 2:
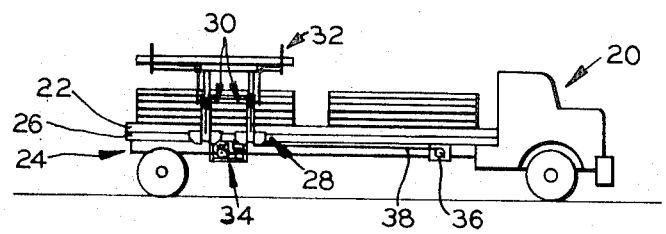
FIG. 2 is a view similar to FIG. 1 illustrating the apparatus in a position to transfer an object between its load supports and the truck.
Figure 3:
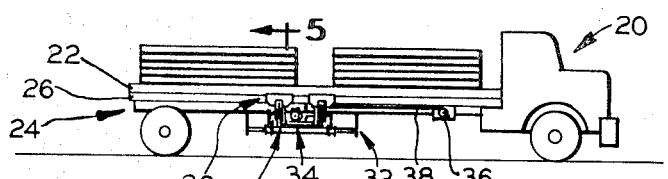
FIG. 3 is a view similar to FIG. 1 illustrating the apparatus in a stored position for transit.

Referring to the drawings, FIGS. 1 through 3 illustrate a truck 20 having a flat bed 22 supported by a frame 24. The bed 22 has a rail 26 attached to one side extending over the length of the side. Depending from the rail 26 and frame 24 is a load manipulating device or a loader and unloader which includes the major components of a base 28, boom linkage 30, cradle 32 and power package 34. The base 28 is slidably attached to the rail 26 and frame 24 to enable the loader and unloader (hereinafter referred to as a "loader") to travel along the side of the bed 22 between the wheels of the truck 20. The loader may be mounted on either side of the bed 22. A winch 36 attached to the bed 22 has a cable 38 for selectively engaging the base 28 to pull the loader toward the winch 36. The reverse motion is achieved by wrapping the cable 38 about a pulley (not illustrated) affixed to the rear of the bed 22 to reverse its direction and attaching the cable to the base 28. The winch may be manual or power driven, and other means can be provided for moving the base such as a pinion on the base 28 and a rack on the bed 22.

The loader can position the cradle 32 on the ground and advance the cradle 32 horizontally toward the object to be loaded upon the truck 20 to thereby engage the object in moving it from its position. The object to be loaded may be a pipe, as illustrated in FIGS. 1 through 3 or any other object, but the loader is particularly suited for elongate objects such as beams, poles, columns, etc. FIG. 1 illustrates the cradle 32 at ground elevation engaging a pipe. FIG. 2 illustrates the loader elevated to position the cradle 32 with the pipe thereon above the load on the truck 20. The cradle 32 has been pivoted to prevent the pipe from rolling off. When the truck 20 is in transit, the loader is collapsed and retracted beneath the bed 22 of the truck 20 in a stored position as illustrated in FIG. 3. The stored position of the loader is illustrated in greater detail in FIGS. 4 and 5 where it can be seen that the entire loader can be collapsed and retracted into a compact package, or unit, which is within the width of the bed 22 and rail 26 so as to not protrude from the side of the truck 20. In the retracted position, the loader does not require the use of any space above the bed 22 of the truck 20 leaving the bed 22 completely free for carrying useful load.

It will be noted in FIG. 4 that, with the exception of the power package 34, the loader is symmetrical about a vertical line passing through the center of the base 28 so that a description of one side of the loader applies to the other side as well and only one side will be described herein unless specifically indicated otherwise. Further, while a dual base 28 and boom linkage 30 provides greater versatility and structural stability a single base and linkage could be used for less demanding service.

Figure 4:
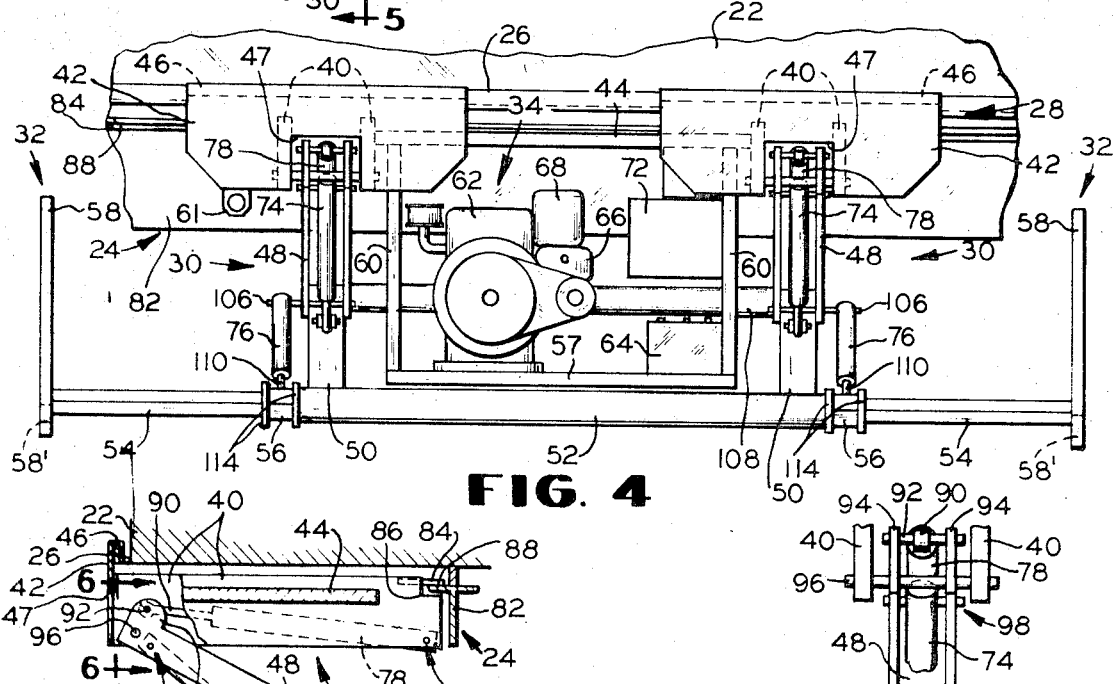
FIG. 4 is an enlarged view of the apparatus and fragments of the vehicle bed and frame shown in FIG. 3.

In FIG. 4, both sides of the loader are illustrated with the base 28 joined by a brace 44 and preferably fabricated from heavy steel plate sections joined by welding or other suitable means. The base 28 is formed by plates 40 attached to a support plate 42 with the brace 44 extending between the innermost plates 40 of each side. Two ninety degree bends in the upper marginal edge of the support plate 42 form a lip 46, best illustrated in FIG. 5, for engaging the rail 26 to suspend the base 28 from the rail 26. The lower edge of the support plate 42 has a cut out 47. An inner boom 48 is pivotally connected by one of its ends to the base 28 within the cut out 47 and depends therefrom. The other end of the inner boom 48 is pivotally connected to one end of the outer boom 50 which in turn has its other end connected to interconnecting means to its corresponding outer boom, for example, support pipe 52, of the cradle 32. The inner and outer booms 48 and 50 form the boom linkage 30.

The support pipe 52, square tubes 54, sleeves 56 and arms 58 combine to form the cradle 32. The two arms 58 are attached to the square tube 54 which is longitudinally slidable within the support pipe 52 and is rotatable therein. The sleeves 56 have apertures therein which conform to the cross section of the square tube 54, or other convenient polygonal shaped tube, to allow the square tube 54 to slide longitudinally with respect to the sleeves, while preventing relative rotation. The adjustment afforded by the longitudinal motion of the square tube 52 within the support pipe 52 allows the cradle 32 additional adjustment of alignment with respect to centering the length of the elongate load members particularly where tandem loads are involved and the loader itself is prevented from centering on the load members on the truck 20 because of interference by a wheel of the truck 20. FIGS. 1 and 2 illustrate the arms 58 to the rear of the truck 20 extended to align with the stack of load members on the rear of the truck bed 22. As shown, the truck wheels prevent the centering of the loader longitudinally of the stacked pipe although the cradle arms are symmetrically positioned along the pipe length by virtue of the adjustment afforded relative to boom linkages 30. The arms 58 on either side of the cradle 32 extend outwardly from the square tube 54 at generally right angles to each other.

The power package 34 is supported from the base 28 on a platform 57 connected to the base 28 by four structural angles 60 at each of the platform corners. The power package 34 is, therefore, integral with the loader and moves with it. The integral construction allows the loader to be completely assembled as a unit to minimize the installation time required in placing the unit on the truck 20. Included in the power package 34 are an integral gasoline engine and hydraulic pump 62, a battery 64, generator 66 and solenoid valving, not illustrated. The engine is self-starting with pushbutton ignition, and the pump includes a suitable reservoir for hydraulic fluid (not shown). Starting power for the engine is provided by the battery 64 with the generator 66 supplying power when the engine 62 is running, at which time the battery 64 charge is restored. Gasoline for the engine 62 is stored in the fuel tank 68.

For remote control of the loader, a control cable (not illustrated) can be inserted into the quick disconnect 61. A control box on the cable provides for actuation of the solenoids on the control valving. A suitable length of control cable enables an operator to operate the loader from a safe distance from the pipe being transferred. When not in use, the control cable is stored in a storage compartment 72 together with the winch crank for a manual winch 36. While the power package illustrated includes an integral engine and hydraulic pump 62 to supply presurized fluid to hydraulic cylinders, it is to be understood that other power sources could be used, for example, an electric motor, where electric power is available, to replace the engine or a series of motors and gear drives to replace the hydraulic components.

A safety feature on the power package 34, as well as one of utility, is that the hydraulic system has sufficient volume of fluid within it to complete one operation of the loader with the engine-pump combination inoperative. Thus, the loader may always be unloaded of an object being transferred and folded to the stored position upon loss of power. The battery 64 provides power for the solenoids in the absence of power from the generator 66 to give control of the operating means for the individual boom linkage 30 and cradle 32. Further, a pressure bleed-off valve is provided to prevent operation of the equipment above 2000 p.s.i. to protect the system components as well as to militate against abusive treatment of the loader.

Figure 5:
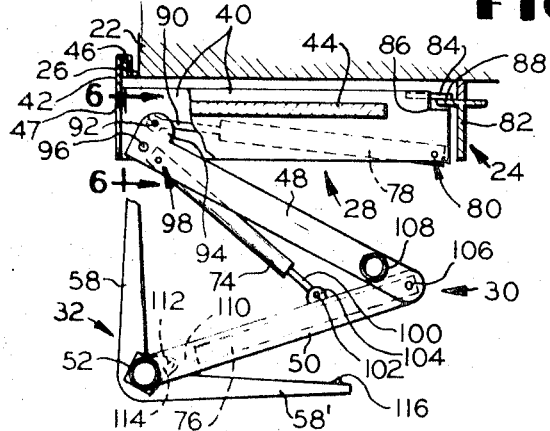
FIG. 5 is an enlarged fragmentary sectional view of the apparatus in FIG. 3 taken along line 5—5 thereof with portions cut away to reveal greater detail.

The power package 34 supplies the pressurized fluid to the operating means for the boom linkage 30 and cradle 32. The operating means consists of hydraulic cylinders. Cylinder 74 for the outer boom 50 is illustrated in FIGS. 4 and 5 as pivoted and fitting between the opposed flanges of the channel forming the inner boom 48. Cylinder 76 for operating the cradle 32 is illustrated in its position along side the outer boom 50. A third cylinder 78 for operating the inner boom 48 is illustrated in FIG. 5. Thus, each boom 48 and 50 as well as the cradle 32 are independently operable. In FIG. 5 the inner boom cylinder 78 is illustrated as pivotally connected between the base plates 40 at 80. The base plates in addition to being supported by the support plate 42 receive support from the sliding connection with a major structural member 82 of the truck frame 24. A plate 84 extending between the opposing faces of the base plates 40 extends outwardly from the base plates 40 over a notch 86 in the plates 40 to form a slot. The slot receives a portion of a flange 88 of the structural member 82 and has sufficient clearance with the flange 88 to allow the base 28 to slide lengthwise of the flange.

Figure 6:
FIG. 6 is a sectional view of the apparatus in FIG. 5 taken along line 6—6 thereof.

The inner boom cylinder 78 has a rod 90 pivotally connected to the pin 92 affixed to the opposed side flanges of the inner boom 48 by lobes 94 forming bell cranks with those flanges. The lobes 94 extend from the sides of the inner boom 48 as best illustrated in FIGS. 5 and 6. A pin 96, on which the inner boom 48 is pivoted, passes through the side flanges of the inner boom 48 and is affixed to apertures in the paired base plates 40. Pivotally connected to the inner boom at 98 is the outer boom cylinder 74 which is positioned within the sides of the channel shaped inner boom 48. A rod 100 of the outer boom cylinder 74 is pivotally connected to the outer boom 50 by a pin 102 passing through the lobes 104 (one illustrated in FIG. 5) which are affixed to the outer boom 50. The outer boom 50 is a square structural tube. The outer boom 50 is pivoted from the inner boom 48 by placing the outer boom within the side flanges of the inner boom at the end opposite its connections to the base 28 and passing a pin 106 through both booms 48 and 50. Pin 106 is affixed to the inner boom 48, and pivots in suitable apertures in the outer boom 50. Adjacent the pin 106 is a pipe 108 extending between the pair of inner booms 48 to lend structural rigidity to the inner booms to which it is affixed. The pin 106 connecting the booms 48 and 50 extends outwardly from the loader to provide a pivot for the base of the cradle cylinder 76. The cradle cylinder has its cylinder rod 110 pivotally attached to a pin 112 passing through the bell crank forming lobes 114 on the sleeve 56 (see FIG. 4).

The operation and versatility of the boom linkage 30 and cradle 32 can be understood by considering the sequential movement of the boom linkage 30 depicted in FIGS. 5, 7 and 8 illustrating the loader in the stored, intermediate and above bed 22 positions, respectively. The boom linkage is unfolded by actuating the inner boom cylinder 78 to retract the rod 90 from its position in FIG. 5 and cause the inner boom 48 to pivot about the pin 96 by the moment created by the force of the rod 90 on the pin 92 which is offset from the pivot point of the inner boom 48, pin 96, and acts through the moment arm between pins 96 and 92. As the rod 90 of the inner boom cylinder 78 reaches the fully retracted position, the inner boom 48 has dropped to the generally vertical position illustrated in FIG. 7. In this position the pivot point of the inner boom 48 about pin 96 and the pin 92 have reached a dead center condition where if the rod 90 is extended, the force it exerts acts directly through the boom pivot pin 96 and cannot cause further pivotal movement of the inner boom 48. Maneuvers of the loader can bring the boom linkage 30 past dead center. Overcenter motion from the stored to the operative position can be achieved by manually shifting inner boom 48 clockwise from its position shown in FIG. 7 and then reversing the fluid to cylinder 78 to extend rod 78. Similarly, motion from the operative position to the stored position, counterclockwise in FIG. 7, can also be manually accomplished since only a slight displacement from the alignment of the stroke of rod 90 and pivots 92 and 96 is required.

The apparatus is of substantial weight in most embodiments and accordingly, it is desirable to accomplish the overcenter motion by other than manual force. In shifting from the stored to the operative position of boom 48, a clockwise moment is developed around pivot 96 by extending the outer boom cylinder 74 to force the outer boom 50 against the ground. This tends to align the inner and outer booms and move their common pivot 106 clockwise sufficiently so that the pivot 92 is below pivot 96 and extension of rod 90 can again assume control of the inner boom 48. Another manipulation providing a clockwise moment around pivot 96 when the line of force of rod 90 is coincident with the line through pivots 92 and 96 is to rotate the cradle 32 counterclockwise with the cradle cylinder 76 after the arm 58 has been engaged with the ground. The reaction force causes movement of the inner boom 48 in a clockwise direction, as wieved in FIG. 7, to bring the pin 92 past the center of the pin 96. The inner boom cylinder 78 can now extend its rod 90 to cause further movement of the inner boom in the clockwise direction.

If the outer boom 50 is now positioned by actuation of cylinder 74, at an elevation slightly below that of a pipe to be picked off of a storage pile near ground level and the cradle 58 is pivoted about the support pipe 52 to bring arm 58 into generally horizontal orientation, movement of the inner boom outwardly results in generally horizontal motion because the inner boom is at the bottom of its arcuate motion. The horizontal movement can be utilized to position the arm 58 of the cradle 32 beneath the pipe. Pivoting of the cradle 32 clockwise as viewed in FIGS. 5, 7 and 8 to raise the arm 58 from the horizontal position results in positive engagement of the pipe between the arms 58 and 58' of the cradle. The pipe is prevented from rolling off of the end of the arms 58 and 58', particularly when the arms are inclined slightly downward as when depositing the pipe, by stops 116. Stop 116 is located on the end of the inside face of the cradle and may be an inverted angle as illustrated in FIGS. 5, 7 and 8 or any reasonable protrusion. In engaging a pipe substantially above ground elevation the inner boom 48 and outer boom 50 may be raised to position the cradle 32 at an elevation slightly below the pipe with the arm 58 oriented as described above. In the raised position the outer boom 50 has horizontal movement as well as the inner boom 48. Motion of two booms 48 and 50 is coordinated to obtain the horizontal movement of the inner boom 48 at the bottom of its path.

FIG. 8 illustrates the inner boom 48 in a raised position which allows the outer boom 50 to position the cradle 32 over the bed 22 of the truck. The inner boom cylinder 78 has its rod 90 extended to cause the inner boom 48 to pivot clockwise from the position illustrated in FIG. 7. Movement of the outer end of the inner boom 48 in the raised position illustrated is generally vertical while that of the outer end of the outer boom 50 is generally horizontal. The horizontal movement of the outer boom permits maneuverability of the cradle over the bed 22. As previously described the cradle 32 is pivoted to engage the pipe and the arms 58 and 58' are inclined upward to secure the pipe within the cradle. The cradle 32 may be pivoted on either side of the support pipe 52 by providing an external force to bring the cradle cylinder 76 past dead center in its retracted position and subsequently extending the cylinder rod 110. The cradle 32 is illustrated in FIG. 8 in an orientation for depositing the pipe on the bed, having been further pivoted and positioned over the bed 22 to bring the arm 58' adjacent the bed 22 in a generally horizontal orientation. The inner boom 48 may now be lowered (counterclockwise movement) to provide generally vertical downward movement to deposit the pipe on supports or pallets etc. on the bed 22. Use of a reasonably thick pallet or support allows the cradle 32 to be further dropped to disengage the pipe and to be withdrawn by movement of the outer boom 50. The loader, by virtue of the articulate booms 48 and 50, can maneuver pipes on either the bed 22 or the ground in a direction widthwise of the bed in addition to providing lift to elevate the objects to be loaded. The loader can unload the truck 20 by reversing the above described movement to pick up an object from the bed 22 and place it on a storage pile. Similarly, the loader can be collapsed for storage by retracting the cylinders 74, 76 and 78 to the position illustrated in FIG. 7 where the weight of the boom linkage 30 and cradle 32 provide sufficient force to bring the inner boom 48 past dead center. The inner boom cylinder 78 is then extended to retract the loader into the stored position in FIG. 5.

As previously pointed out, the power package supplying pressurized fluid to the cylinders is remotely controlled by solenoid-operated valves. Thus, the above motions are controlled by pushbutton. The only manual operations required are longitudinal adjustment of the cradle tubes 54 where necessary to center the arms 58 with respect to the length of the object to be handled and the attachment of the control cable.

FIGS. 9 and 10 illustrate another embodiment of the loader adapted particularly to use on a semi-trailer 120 with tandem loads. The tractor portion of the semi-trailer 120 may be separated from the trailer portion to allow use of the tractor portions while the trailer portion is being unloaded or loaded. The trailer portion of the semi-trailer 120 has a flat bed 122 supported by a frame 124. The bed 122 has a rail 126 attached to one side and extending over the length of the side. Depending from the rail 126 and frame 124 is a loader similar to that of the first embodiment described above but which has its power package 134 separately mounted in a stationary location beneath the bed 122 of the semi-trailer 120. The separation is necessary to enable the loader to operate adjacent the rear wheels of the semi-trailer 120 as illustrated in FIG. 9 and to travel along the side of the bed without being limited in its travel by the wheels of the semi-trailer 120. The loader includes a base 128, boom linkage 130 and cradle 132 with the base 128 slidably attached to the rail 126 and semi-trailer frame 124 in the same manner as the loader of the first embodiment. A winch 136 and cable 138 may also be used to move the loader back and forth over the length of the bed 122. FIG. 9 illustrates how travel past the wheels allows the loader to center on the rearward tandem load, together with the operative position of the loader with the cradle 132 extended above the stack of pipe on the semi-trailer 120. The stored position of the loader ahead of the trailer wheels with the boom linkage 130 collapsed and retracted beneath the bed 122 is illustrated in FIG. 10. Either side of the semi-trailer 120 may be used for mounting the loader on the semi-trailer 120. The power package 134, in FIG. 9 is identical to that described above for the first embodiment and, therefore, will not be described again. One exception exists and that is that the solenoid valving 140 is located on the base 128 to reduce the number of hydraulic lines between the loader and the power package from about twelve to two.

The remaining major differences are in the construction of the base 128, in the addition of a telescoping member to the boom linkage 130 and in the elimination of the adjustable tubes supporting the arms of the cradle 132. As in the first embodiment, the loader is symmetrical, and, therefore, only one side is illustrated and described unless specifically indicated otherwise.

FIG. 11 illustrates both sides of the loader wherein the interconnection can be seen between the two sides in the brace 142 and square tube 144. The loader is in the stored position. The solenoid valves 140 have been omitted to clarify the mechanical relationships of the movable elements and their supports. The base 128, preferably fabricated from steel plates by welding or like suitable means, is formed by plates 146 attached to a support plate 148. The upper marginal edge of the support plate 148 has two ninety degree bends in the end portions to form lips 150 best illustrated in FIG. 13, for engaging the rail 126 to suspend the base 128 from the rail 126. The center portion of the support plate 148 marginal edge is rolled to form a tube 152 for receiving a pin 154 the use of which will be described below. The lower edge of the support plate 148 has a cut out 155. An inner boom 156 is pivotally connected by one of its ends to the base 128 within the cut out 155 together with the sub-base consisting of sub-plates 158 all of which depend from the base 128. The other end of the inner boom 156 is pivotally connected to one end of the outer boom 160, and other end of the outer boom contains an extension in the form of a telescoping boom 176 on which is mounted the support sleeve 164. The inner and outer boom 156 and 160 form the boom linkage 130.

The cradle 132 is formed by support pipe 166, collars 168 and arms 170. Cradle 132 is pivotally connected to the outer boom 160 by the support sleeve 164 which is attached to the telescoping boom 176. The support pipe 166 provides interconnecting means for the arms 170 and is rotatable within the sleeve 164 when a force is applied to the bell cranks 172 of the collar 168 affixed to the support pipe 166. Pivotally suspended from the sub plates 158 are latch links 174 which are in an inoperative position when the loader is in the stored position and latch the sub-plates 158 in a vertical position when the loader is in the operative position.

Figure 12:
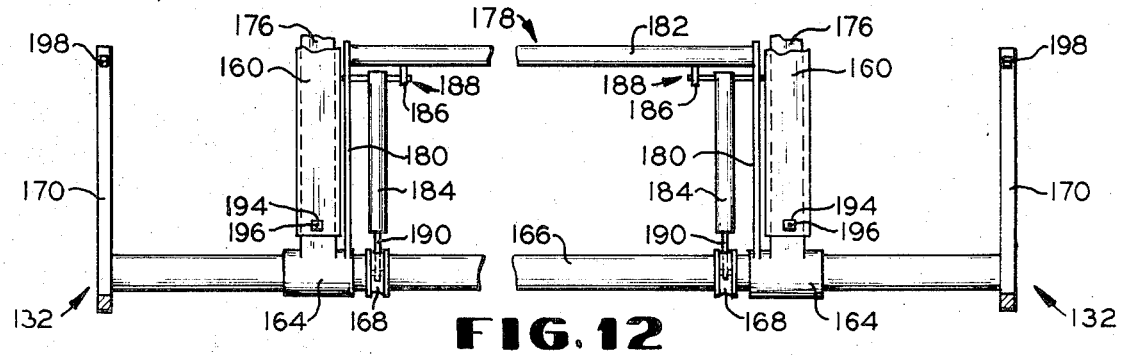
FIG. 12 is a sectional view of the apparatus in FIG. 11 taken along line 12—12 thereof.

FIG. 12 illustrates the telescoping boom 176 in a retracted position within the outer boom 160 which is the position assumed when the loader is stored as illustrated in FIG. 11. Since the cradle 132 is mounted on the telescoping boom 176 and travels with it, the operating means for the cradle 132 must also be capable of traveling with the telescoping boom 176. A movable base 178 is provided for supporting the operating means of the cradles which is more easily understood as a unit encompassing both sides of the loader and will, therefore, be described with respect to both sides. The movable base 178 has a side member 180 on each side supported at one end from each support sleeve 164 and coextensive with the telescoping boom 176. The other end of member 180 supports a cylindrical member 182 extending between the side members 180 and affixed thereto. The side and cylindrical members 180 and 182 may be structural steel plates and tubes respectively or other suitable structures welded together or fabricated by other suitable means. The cylindrical member 182 provides a first base for pivotally mounting the operating means of the cradle 132 which is hydraulic cylinders 184 each pivotally connected to a side member 180 and a mount 186 as at 188. The rod 190 of each cradle cylinder 184 is pivotally attached to the offsets 172 on the collar 168 by a pin 192 affixed to and extending between the offsets 172, as best illustrated in FIG. 11. The cradle 132 may be pivoted by stroking the cylinder rods 190 with the offsets 172 on either side of the support pipe 166 to approach 360° of arcuate travel with the cradle 132. With the cylinder rod 190 fully retracted a dead center condition, described above for the inner boom 48 of the first embodiment, exists and a force external to the loader such as engagement with the ground, the weight unbalance of the cradle arms, or weight of the object lifted is required to bring the cradle 132 past this point.

Each telescoping boom 176 is a square tube, as is each outer boom 160, and the telescoping boom is withdrawn manually from the outer boom 160 with the loader in the stored position. As the telescoping boom 176 moves outwardly, the movable base 178 moves with it carried by the support sleeve 164 which also supports the cradle 32 advancing them as a unit. On the outer ends of the outer booms 160, locks 194 are provided having spring biased pins 196 for engaging associated apertures in the telescoping boom 176 to secure the boom 176 in the extended position. Intermediate telescoping boom 176 positions may be provided where desirable by providing a plurality of apertures in the telescoping boom 176 for selective engagement by the pin 196.

The arms 170 of the cradle 132 are similar to those described for the loader in the first embodiment and include stops 198 for preventing objects lifted by the arms 170 from rolling or sliding off of the arms 170. Further, the cradle cylinders 184 and the cylinders providing the operating means for the boom linkage 130 are actuated by pressurized fluid from the power package 134 in the same manner as described for the loader in the first embodiment.

Figure 13:
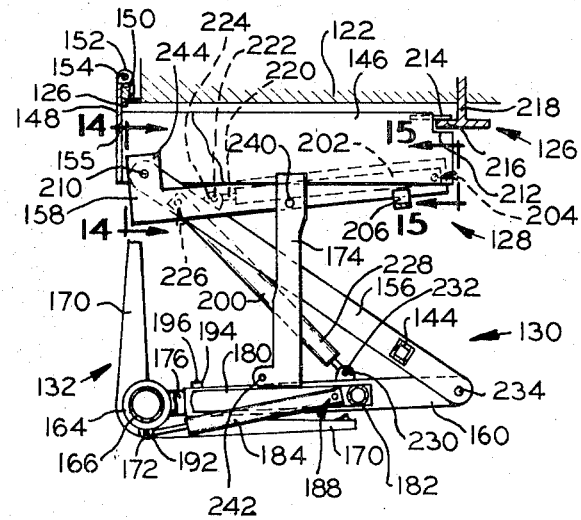
FIG. 13 is an enlarged fragmentary sectional view of the apparatus in FIG. 10 taken along line 13—13 thereof with portions cut away to reveal greater detail.
Figure 14:
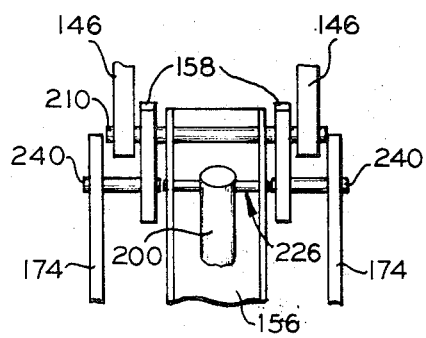
FIG. 14 is a sectional view of the apparatus in FIG. 13 taken along line 14—14 thereof.
Figure 15:
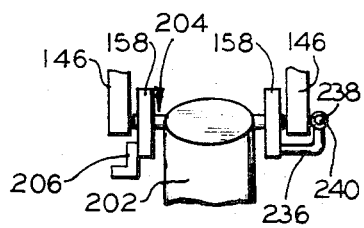
FIG. 15 is a fragmentary end view of the apparatus in FIG. 13 taken along line 15—15 thereof.

A cylinder 200 for the outer boom 160 is illustrated in FIG. 11 and is located within the inner boom 156. A third cylinder 202 for operating the inner boom 156 is illustrated in FIG. 13. FIGS. 11, 13 and 14 illustrate how the boom linkage 130 is assembled. In FIGS. 13 and 15 the inner boom cylinder 202 is illustrated as pivotally connected between the sub-plates 158 at 204. A cross bar 206 extends between the two sides of the loader and turns at right angles on its ends which are affixed to the innermost sub plates 158 to interconnect the sub-bases formed by each pair of sub-plates 158 causing them to move as a single unit. The base plates 146 support the sub plates 158 which are pivoted, together with the inner boom 156, about a pivot pin 210 passing through and affixed to the base plates 146. A notch 212 in the base plates 146 and a plate 214 extending outwardly from the base plates 146 over the notch 212 form a slot to receive a portion of a flange 216 of a structural member 218 of the semi-trailer frame 126. As in the previous embodiment of the loader, the slot and lip 150 portion of the support plate 148 combine to slidably support the base 128 which is movable over the length of the rail 126.

The inner boom cylinder 202 has a rod 220 pivotally connected to the pin 222 affixed to the inner boom 156 by lobes 224 (one illustrated in FIG. 13) affixed to the inner boom 156 as bell cranks. The inner boom is channel shaped to receive the outer boom cylinder 200 which is pivotally connected to the inner boom 156 to 226 as illustrated in FIGS. 13 and 14. A rod 228 of the outer boom cylinder 200 is pivotally connected to the outer boom 160 by a pin 230 passing through the lobes 232 (one illustrated in FIG. 13) which are affixed to the outer boom 160. The outer boom 160 is pivoted from the inner boom 156 by placing the outer boom within the inner boom at the end opposite its connections to the base 128 and passing a pin 234 through both booms 156 and 160. Pin 234 may be affixed to the inner boom 156 and freely pivots on the outer boom 160. Adjacent the pin 234 is the square tube 144 extending between the paid of inner booms 156 as illustrated in FIG. 11.

FIG. 15 illustrates locking means for the sub-base of the inner boom cylinder 202. The lock comprises an apertured plate 236 affixed to the outer sub-plate 158 extending outwardly beneath the outer base plate 146 and turning upwardly. When sub-base 158 is retracted to its stored position, the aperture in lock plate 236 registers with a tube 238 affixed to the outside of the outer base plate 146. A pin 240 is inserted through the tube 238 and the aperture to lock the sub-base in the stored position.

FIGS. 13 and 14 illustrate the manner in which the link 174 is pivoted from the sub-base plate 158 by a pin 240 affixed to the sub-plate 158. The link 174 pivots on the pin 240 and may be retained by any conventional means, for example, a cotter key.

Figure 16:
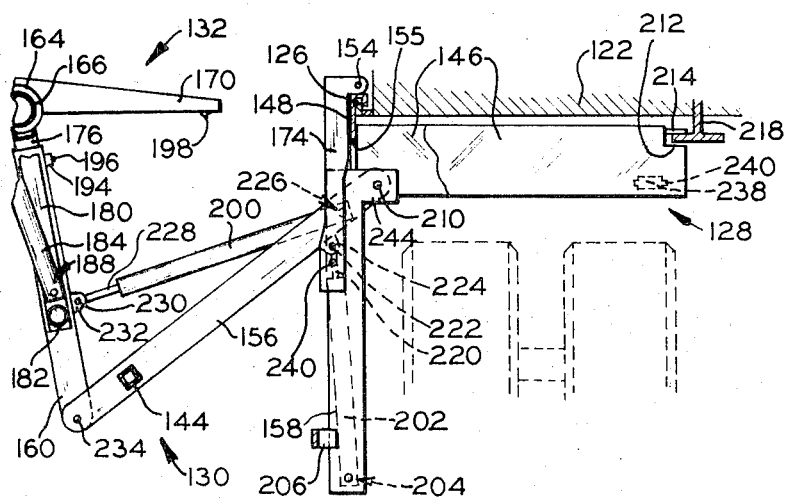
FIG. 16 is a view similar to FIG. 13 illustrating the apparatus in a different operative position.

The operation and versatility of the boom linkage 130 is similar to that of the boom linkage 30 of the loader in the first embodiment and the cradle operation is identical. FIGS. 13 and 16 illustrate the loader in the stored and an intermediate position respectively. The major difference in the operation of the boom linkage 130 is in bringing the sub-base into operating position.

The operating position of sub-plates 158 is shown in FIG. 16. Plates 58 are perpendicular to plates 146 to position their free ends near the ground and outboard of a longitudinal projection of the wheels of the semi-trailer whereby the inner boom cylinder 202 is pivoted on a base at 204 which can be in transverse registry with the wheels. The shift of the plates 158 between their stored position of FIG. 13 and their operating position of FIG. 16 can be accomplished by the hydraulic drives for the boom linkage 130.

It will be noted that the inner boom cylinder 202 is not connected to the inner boom 156 for movement across dead center as in the previous embodiment so that when it is actuated to extend the rod 220 the inner boom 156 swings about the pivot pin 210 to a position generally as it is shown in FIG. 16 while the sub-plates 158 remain locked to the base plate 146 as illustrated in FIG. 13. With the inner boom cylinder rod 220 in the extended position, the outer boom cyclinder 200 is actuated to extend the rod 228 and bring the outer boom 160 down into contact with the ground. Sufficient force is exerted by the outer boom 160 against the ground to support the weight of the boom linkage 130 and thereby relieve the inner boom cylinder 202 together with the sub-plates 158 for supporting the weight of the boom linkage 130. The locking pin 240 (FIG. 15) may now be removed and the inner boom cylinder rod 220 retracted. With inner boom 156 secured against the ground by the outer boom 160, the retraction of the inner boom cylinder 202 causes the unlocked sub-plates to pivot downwardly about the pivot pin 210 into the generally vertical position illustrated in FIG. 16. The latch links 174 are manually swung upwardly into a position adjacent the support plate 148, as illustrated in FIG. 16, where an aperture 242 in each link is aligned with the tube 152 on top of the support plate 148, best illustrated in FIG. 13. A pin 154 is passed through both the tube 152 and the aperture 242 in the links 174 to lock the links 174 in place. The links abut the face of suport plates 148 thereby preventing the sub-plates 158 from pivoting inwardly. The outer boom 160 can then be released from engagement with the ground. The sub-base is secured by the sub-plates 158 in an operative position with the inner boom cylinder 202 generally vertically oriented within the sub-base. Pivoting the sub-base from the offset right angular portion 244 of the sub-plates 158 provides adequate clearance for the vertically oriented sub-base to travel past the wheels of the semi-trailer (illustrated by dotted lines in FIG. 16).

With the sub-base in the operative position, activation of the inner boom cylinder 202 causes the inner boom 156 to swing upwardly and bring the outer boom 160 and cradle 132 over the bed 122 of the semi-trailer in the same manner as illustrated in FIG. 8 for the loader in the first embodiment. Further, all the horizontal and vertical movements together with the pivotal movement of the cradle described above for the previous loader can be achieved with the inner and outer booms 156 and 160 and cradle 132 of the second embodiment when in the operative position illustrated in FIG. 16.

To collapse the boom linkage 130 for storage, the above movements are reversed with the outer boom 160 again used to support the weight of the boom linkage while the latch links 174 are released from the locked position. With the sub-base unlocked by release of the links 174 and the boom linkage 130 supported on the ground, the inner boom cylinder 202 can be extended to swing the sub-base into the stored position between the base plates 146 where it can be locked in place. Subsequently, the outer boom 160 is released from its supporting position against the ground and the outer boom cylinder rod 228 is retracted to collapse the outer boom 160 onto the inner boom 156 with the cradle 132 pivoted with one arm 170 generally paralleling the outer boom 160. Retraction of the inner boom cylinder rod 220 causes the inner boom 156 to swing beneath the bed 122 of the semi-trailer retracting the loader to the stored position illustrated in FIG. 13 with all components beneath and within the width limits of the bed 122.

As described above, the telescoping boom 176 is manually withdrawn when additional outer boom length is desired and is most convenient to withdraw when the outer boom 160 is in a generally horizontal position. Thus, the telescoping boom may be withdrawn before release of the boom linkage 130 from its stored position (FIG. 13) or with the sub-base in the operative position (FIG. 16) by proper extension of the outer boom cylinder rod 228 to bring the outer boom 160 into a generally horizontal orientation. It is to be understood that the telescoping boom 176 could also be installed on the loader of the first embodiment. The telescoping boom 176 adds additional reach to the boom linkage 130 with respect to movement outward from the loader to reach a storage pile, movement upward to pile or stack of objects on the bed 122 and movement widthwise of the bed 122 in depositing the objects loaded on the bed 122.

Since the power package 134 used as a source of power for the cylinders 184, 200 and 202 is the same as for the loader in the first embodiment, the operation of the loader is also automatic from push button controls which are remote from the loader. Only the extension of the telescoping boom 176 and the locking of the sub-base in its operable and stored positions are manual requirements. The boom linkage 130 and cradle 132 are otherwise pushbutton operable from the stored position to the operating position and through all operable movements.

An example of the power package used for the loader is 5 hp. engine with integral direct drive hydraulic pump having an eight gallon reservoir, the pump working pressure is in the range of 1200 to 1300 p.s.i. and is capable of operation at 2000 p.s.i.

The integral loader, i.e., the loader of the first embodiment with the power package mounted on it and the inner boom which passes over center, has an inner boom swing of approximately 260° from the stored position outwardly. The sub-base loader of the second embodiment, has an inner boom swing of approximately 160° from the operative position (FIG. 16) and the sub-base swings through slightly more than 90°. Each loader embodiment has an outer boom which can swing through approximately 160° and cradles which are pivoted on either side of the outer boom by crossing dead center with swings approaching 180° to give almost complete circular rotation of the cradles.

For an integral loader mounted on a 27 foot truck having a flat bed with its bottom 50 inches off of the ground and 95½ inches between the rails which can support the loader, a 40 inch long inner boom and 34 inch outer boom were found to give a clearance of approximately 15 inches from the ground with the loader in the stored position. With a cradle having an arm of 24 inches normally operating inwardly of the truck and the other arm 28 inches long, the loader has a reach of 5½ feet outwardly from the support rail of the truck bed and an inward reach with the inner cradle arm widthwise of the bed of the truck of 20 inches. The travel of the loader along the length of the bed of the truck is approximately 12 feet.

The sub-base loader will have the same 15" clearance from the ground as the integral loader using the same size booms of 40 and 34 inches when mounted on a 40 foot semi-trailer having a flat bed with its bottom 50 inches off of the ground and 95½ inches between the rails which can support the loader. With a telescoping boom extension of 26 inches and cradle arm lengths of 3½ and 4 feet inward and outward, respectively, the loader will have a reach of 7½ feet outwardly from the support rail and an inward reach with the cradle arms of approximately one half the width of the bed. The travel of the loader along the length of the bed of the trailer will be 40 feet.

In both embodiments the arc of the extreme end of the inner boom should clear the ground through its motion between the stored and operative position. The extreme end of the inner boom is, therefore, spaced from the pivotal connection between the other end of the inner boom and the base spaced less than the height of the pivotal connection from ground level. The extreme end of the inner boom is pivoted in an arc around its pivotal connection to the base from a first limit beneath the vehicle bed to a second limit higher than the vehicle bed. Similarly, one end of the outer boom is pivoted from the extreme end of the inner boom and the other end of the outer boom is spaced from the pivotal connection between the two booms a distance within the width limit of the vehicle bed and above ground level when the inner boom is positioned in the first limit beneath the vehicle bed. For other truck and trailer dimensions, the dimensions of the booms and cradle arms would be adjusted to keep adequate clearance from the ground to the loader in the stored position and maintain the loader within the width of the bed.

Typical of the objects which the loader embodiments are capable of handling are one to 48 inch diameter pipe with the one inch pipe handled in bundles and the 48 inch pipe handled one piece at a time. The integral loader can handle lengths of pipe from 18 feet upward to the maximum length for the truck bed, while the sub-base unit can handle lengths from 5 feet to the maximum length for the trailer. Each embodiment is capable of lifting up to 3600 pounds with the normal lifting range being 1800 pounds to 2500 pounds.

It will be understood that the integral unit is suitable for use on trailers as well as trucks and that the sub-base unit may be used on trucks as well as trailers. Further, the loaders may be used on any vehicle having side access to the load carry surface of the vehicle.

The loader in either embodiment is particularly suited for flat bed vehicles and has a great deal of maneuverability for movement of work pieces. It is conveniently storable when the vehicle is in transit, and automatically unfolded, or collapsed, and retracted. The loader is self-powered and, therefore, operable independent of the vehicle engine. When mounted on a trailer, the loader can be operated when the cab is separated from the trailer. The articulate linkage of the loader allows the objects to be picked up from various elevations from near the ground to above the bed of the vehicle and deposited on the bed of the vehicle or on a stack of objects thereon. The operator can operate the loader from a remote location for his greater safety. The rugged design of the loader further adds to its safety in addition to positively engaging the objects to be transferred thereby eliminating the need of rolling or sliding the objects which may be dangerous as well as injurious to the objects themselves.

In view of the variations in structure embodying the invention and the wide range of their utilization, it should be understood that the above disclosure is merely illustrative and should not be read in a limiting sense. The invention may be practiced otherwise than as specifically illustrated and described without departing from its spirit or scope.

What is claimed is:

1. Load transfer mechanism adapted for mounting on the side of a vehicle having a width limit for the transfer of load articles between the vehicle bed and a location adjacent the vehicle comprising:

a base attached to the side of the vehicle;
an inner boom having first and second ends;
a first pivotal connection between said inner boom first end and said base at a level proximate to the vehicle bed having a pivot axis parallel to the side of the vehicle within the width limit of the vehicle bed, said connection being spaced from said second end less than the height of said pivot from ground level;
first operating means connected between said base and said inner boom and adapted to drive said inner boom second end in an arc around said first pivotal connection from a first limit beneath the vehicle bed to a second limit higher than the vehicle bed;
an outer boom having first and second ends;
a second pivotal connection between said inner boom second end and said outer boom first end parallel to the side of the vehicle, said second pivotal connection being spaced from said outer boom second end a distance within the width limit of the vehicle bed and above ground level when said inner boom is at said first limit;
means for engaging load articles to be transferred attached to said outer boom second end; and
second operating means connected to said outer boom and adapted to drive said outer boom second end in an arc around said second pivotal connection.

2. Apparatus as defined in claim 1 wherein said base is movably attached to the vehicle for aligning said apparatus with the objects on the vehicle bed.

3. Apparatus as defined in claim 2 including means for moving said base relative to the vehicle.

4. Apparatus as defined in claim 2 wherein said base is attached to one side of the vehicle bed for slidably moving parallel to the longitudinal axis of the vehicle.

5. Apparatus as defined in claim 1 wherein said engaging means includes a cradle; and a third pivotal connection between said outer boom second end and said cradle.

6. Apparatus as defined in claim 5 including a third operating means for moving said cradle in an arc about said third pivotal connection.

7. Apparatus as defined in claim 6 wherein said third pivotal connection is parallel to the longitudinal axis of said vehicle.

8. Apparatus as defined in claim 5 wherein said cradle includes two pairs of arms connected to each other at generally right angles and a means interconnecting each pair.

9. Apparatus as defined in claim 8 wherein said interconnecting means includes at least one member movable with respect to said interconnecting means for providing adjustment of the position of at least one pair of arms relative to the distance from said other pair of arms to align said arms on the object to be transferred.

10. Apparatus as defined in claim 1 wherein said inner boom includes opposing lobes on said first end extending outwardly from and longitudinally of said inner boom, a pin extending between said lobes, said pin having its longitudinal axis parallel with the axis about which said inner boom pivots on said base and offset therefrom, said pin pivotally connected to said first operating means to cause said inner boom to pivot from said first limit to said second limit.

11. Apparatus as defined in claim 1 wherein said base includes a sub-base pivotally connected by one end to said base about the same axis as said inner boom, said first operating means coupled to said base through coupling to the other end of said sub-base, said sub-base and said first operating means being pivotal together from a position beneath the vehicle bed to an essentially vertical position outboard of the bed to clear obstructions depending from the underside of the bed.

12. Apparatus as defined in claim 11 wherein said base is movably attached to the vehicle for aligning said appaartus with the objects on the vehicle bed.

13. Apparatus as defined in claim 11 including means for moving said base relative to the vehicle.

14. Apparatus as defined in claim 11 wherein said base is attached to one longitudinal side of the vehicle bed for slidably moving over the length of the bed and past the wheels of the vehicle with the sub-base outboard of the bed.

15. Apparatus as defined in claim 11 including at least one link pivotally connected to said sub-base for securing to said base when said sub-base is in the essentially vertical position, said link abutting said base to prevent movement of said sub-base to the position beneath the vehicle bed.

16. Apparatus as defined in claim 1 including a telescoping boom for extending the length of said outer boom interposed between said outer boom and said engaging means.

17. Apparatus as defined in claim 2 including a power source for said operating means mounted on said base for movement with said base.

18. Apparatus as defined in claim 1 including a second inner boom and a second outer boom spaced apart from said first mentioned inner and outer booms, said second inner and outer booms having pivot points on common axes with said first mentioned inner and outer booms.

19. Apparatus as defined in claim 11 including a second sub-base and second inner and outer booms each spaced apart from said first mentioned sub-base and first mentioned inner and outer booms respectively, said second sub-base and second inner and outer booms each having pivot points on common axes with said first mentioned sub-base and first mentioned inner and outer booms respectively.

References Cited

UNITED STATES PATENTS

| | | | |
|---|---|---|---|
| 2,935,214 | 5/1960 | Fly | 214—77 R |
| 2,665,815 | 1/1954 | Blight | 214—77 R |
| 3,603,464 | 9/1971 | Teodorescue | 214—77 R |

ROBERT J. SPAR, Primary Examiner

U.S. Cl. X.R.

214—77 R